March 20, 1934.  R. G. BIRR  1,951,786
HOLDER FOR FROZEN CONFECTIONS
Filed April 26, 1933   2 Sheets-Sheet 1
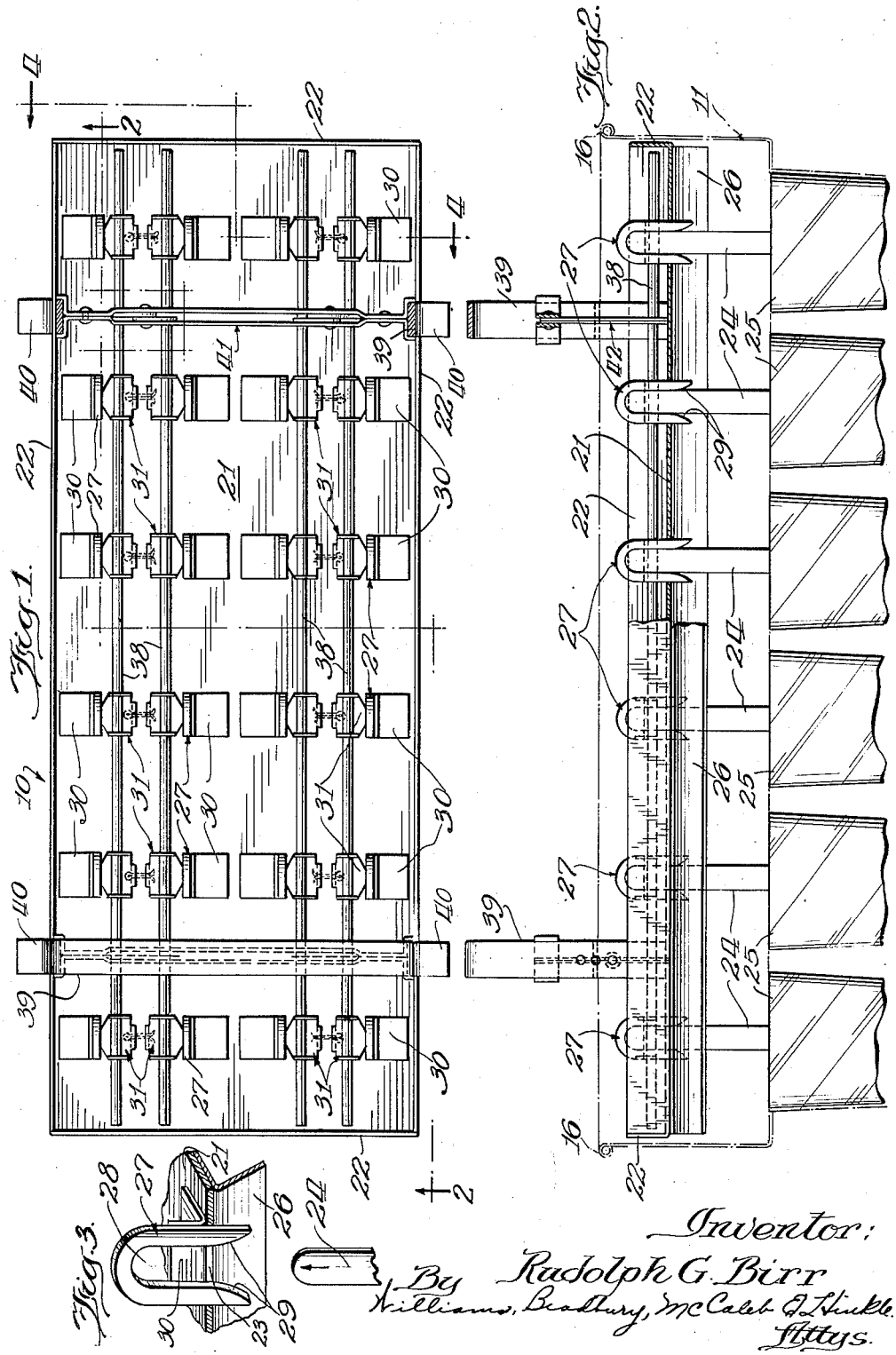
Inventor:
Rudolph G. Birr
By Williams, Bradbury, McCaleb & Hinkle
Attys.

March 20, 1934.  R. G. BIRR  1,951,786
HOLDER FOR FROZEN CONFECTIONS
Filed April 26, 1933  2 Sheets-Sheet 2
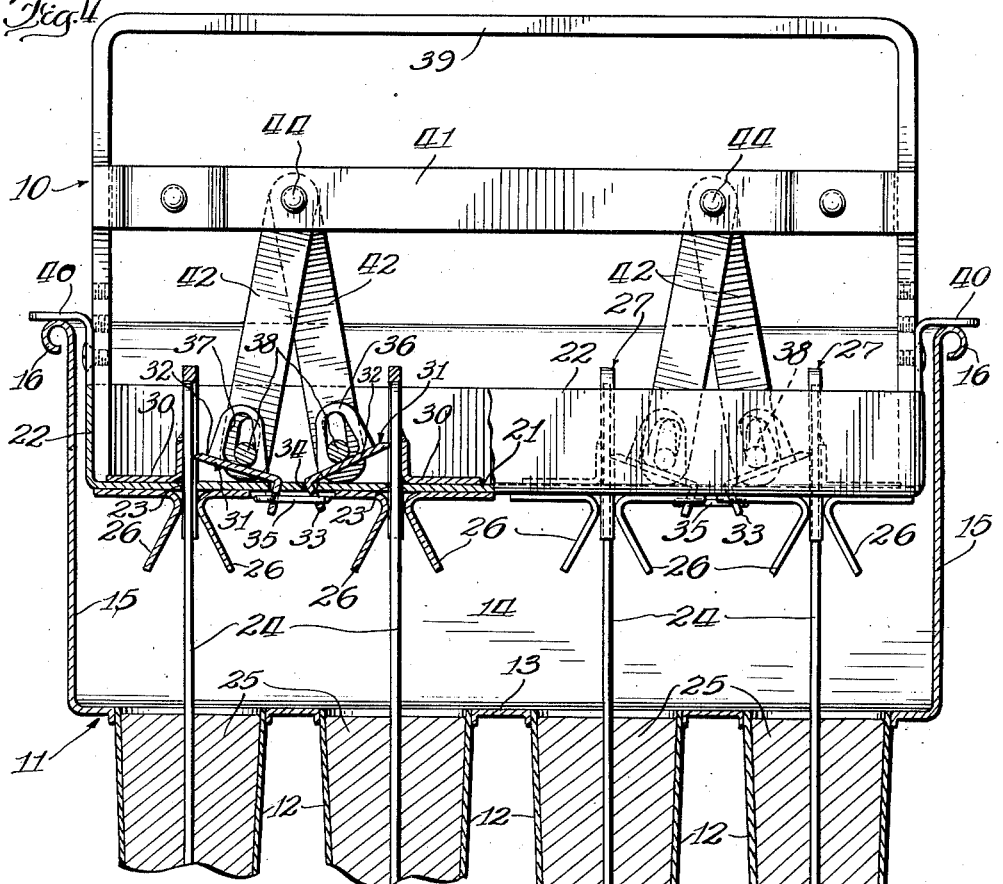
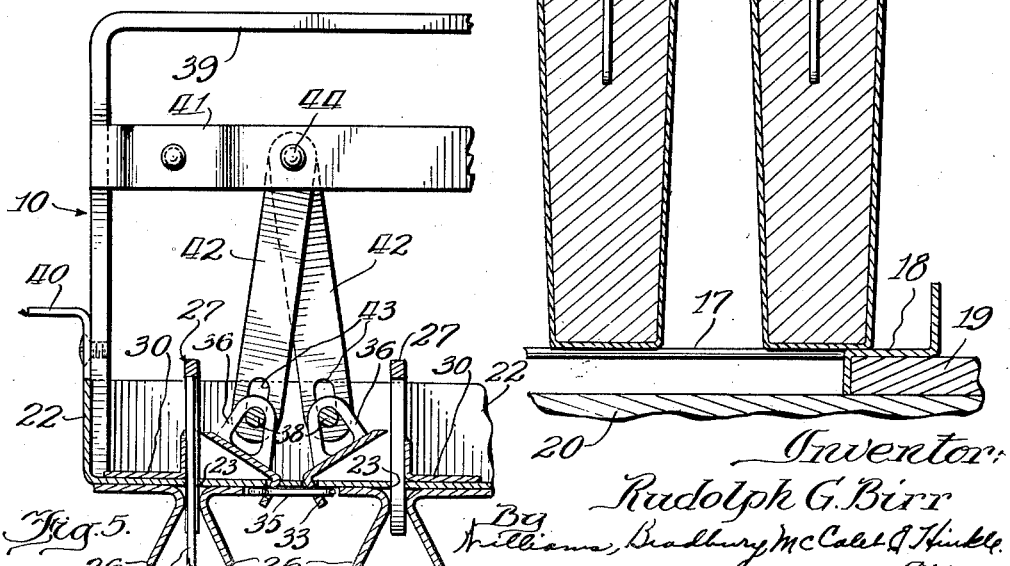

Patented Mar. 20, 1934

1,951,786

UNITED STATES PATENT OFFICE 1,951,786

HOLDER FOR FROZEN CONFECTIONS

Rudolph G. Birr, Lombard, Ill., assignor to Precision Metal Workers, Chicago, Ill., a corporation of Illinois Application April 26, 1933, Serial No. 667,972

8 Claims. (Cl. 107—8)

This invention relates to holders for frozen confections and particularly to frozen confections which are provided with sticks to serve as handles.

The invention is particularly intended to operate with molds having a plurality of pockets, in which the frozen confections are formed, such a mold being described and shown in my copending application, Serial No. 662,706, filed March 25, 1933. Such a mold is provided with a large number of pockets arranged in longitudinal and transverse rows, and in the aforesaid application means are disclosed whereby the frozen confection in each mold is provided with a stick or handle.

According to the present invention, I have produced a holder which is adapted to be applied to such a mold so as to receive the upper ends of said sticks. The holder is provided with automatic means for gripping the sticks and means adapted to be actuated to release the sticks. Consequently, the holder may be employed to engage the sticks, withdraw the confections from the mold pockets, and hold the confections while being treated in subsequent operations, for example, chocolate-coating, and final chilling. When manufacture is complete, the actuating means may be employed to release the handles.

The invention will be readily understood from the following description of a preferred embodiment thereof, taken in conjunction with the accompanying drawings, in which Figure 1 is a top plan view of the holder;

Figure 2 is a side elevation thereof, partly in section, the section being taken on the line 2—2 of Figure 1;

Figure 3 is a perspective detail view showing part of the elements associated with the upper end of the handle, on a somewhat larger scale;

Figure 4 is an end elevation, partly in section, of the holder associated with a mold shown in section, the section through the holder being taken on the line 4—4 of Figure 1; and Figure 5 is a fragmentary view corresponding to the left-hand portion of Figure 4, showing the manner in which the handles are released.

Referring to the drawings, the reference numeral 10 designates the holder and the reference numeral 11 the mold having a large number of pockets 12 in which the confections are formed. These pockets are arranged so as to depend from the bottom 13 of a dish-like portion 14 of the mold which comprises sides 15 provided with beaded upper edges 16. The pockets 12 rest upon transverse bars 17 to which they may be spot-welded or otherwise suitably connected. The bars 17 are rigidly secured to rail elements 18 which are adapted to engage rails 19 on a table 20 so that the mold may be slid along in the desired direction.

The holder 10 comprises a base portion 21, which may be in the form of a plate which is somewhat smaller than the dish portion 14 of the mold, so that it may be inserted thereinto. The plate 21 is provided with upturned walls 22 which, together with the plate 21, constitute a dish-like integral element.

The plate 21 is provided with openings 23 corresponding in shape, number and location to the sticks 24 of the confections 25 formed in the pockets 12 of the mold. In the embodiment illustrated there are four longitudinal rows of openings arranged in six transverse rows, there being twenty-four pockets in the mold 15 arranged in this order.

On its under side the plate 21 has secured thereto, suitably by spot-welding, pairs of angle strips 26, the strips of each pair being located adjacent and on opposite sides of a longitudinal row of openings 23. The angle strips 26 are bent to an acute angle so that the downwardly extending flanges diverge outwardly from the openings 23 associated with them. These outwardly diverging flanges serve as guides which direct the upper ends of the handles 24 into the appropriate openings.

In the embodiment of the invention illustrated, the openings 23 are wider than the width of the sticks or handles 24, and each opening has inserted therein a guide and stop element 27 of generally horseshoe form, the two ends being directed downwardly. Between the two legs of the element 27 there is an opening 28 of the same width as the stick 24, and the upper end of this opening is curved so as to correspond with the curved end of the stick. The lower ends of the legs of the stop element 27 are cut away on their inner sides to provide curved surfaces 29 which serve to guide the sticks 24 into proper relation with the stop element 27, or rather, they serve to aid in positioning the holder with relation to the sticks so as to bring the latter into alignment with the openings 28.

On its upper side the plate carries a plurality of angle elements 30, one flange of which is secured to the plate 21, for example, by spot-welding, the other flange having its outer vertical face in alignment with one edge of an opening 23. As illustrated in Figure 3, it is preferred to make the angle element 30 approximately the same length as the width of the stop element 27, and the vertical flange of the angle element is connected to the stop element 27 by welding, soldering or other suitable means.

As best seen in Figure 1, I prefer to locate the elements 30 in rows on one side of a longitudinal row of openings 23. In the embodiment of the invention illustrated, I locate the angle elements 30 of the outermost longitudinal rows on the outer sides of said rows, and I prefer to locate the angle elements of the two inner longitudinal rows of openings 23 on the inner side of said rows.

Opposite each element 30 I provide a pivoted dog 31 which is adapted to dog a stick located between the dog and the corresponding element 30. As shown in Figures 4 and 5, the dogs 31 comprise a relatively flat pointed portion 32 and a relatively short portion 33 turned downwardly therefrom at one end. The pointed end is adapted to approach the corresponding angle element 30, and the downwardly-turned portion 33 is adapted to project through an opening 34 at the appropriate position in the plate 21.

As best seen in Figure 4, as a result of the location of the angle elements 30, the dogs 31 are located in two pairs of adjacent rows. The portions 33 of the dogs 31, which project through to the under side of the plate 21, are provided with openings, and an adjacent pair may suitably be connected together by a cotter pin 35 which secures the dogs in position while allowing them the angular movement necessary for gripping the sticks 24.

It will readily be seen that, if a stick 24 is pressed upwardly through a slot 23, or conversely, the holder 10 is moved downwardly so as to pass the slot 23 over the end of a stick 24, and the dog 30 associated with said opening will be lifted up into a position such as is shown in Figure 4, the final position depending upon the thickness of the stick in which there may be some irregularities. The dog 30 will engage the stick and prevent its removal until the dog is elevated. Means for elevating the dogs simultaneously will now be described.

Each dog 30 is provided at each side with an upwardly turned flange 36. Each flange 36 is provided with a relatively large opening, and the openings of each longitudinal series of dogs are located in longitudinal alignment. Through each aligned series of openings 37 extends freely a rod 38 which approaches the walls 22 carried at each end of the plate 21. These end walls prevent the rods from being removed longitudinally. It will readily be seen that, if one of the rods 38 is elevated sufficiently, all the confections supported by their handles, by engagement of the dogs associated with this rod, will be released. Means are provided whereby all of the rods may be elevated simultaneously, which means will be described hereinafter.

The holder 10 is provided with a pair of handles 39, preferably located near opposite ends of the holder. Each handle may preferably consist of a strap located transversely with respect to the holder and having downwardly turned ends which are welded or otherwise secured to the side walls 22 of the plate 21. The downwardly turned lengths of the handles 39 are preferably provided with lugs 40 which are suitably secured to the handles 39 by means of screws.

It is preferred to provide a plurality of threaded openings in each of the downwardly turned ends of the handle 39 so that the lugs 40 may be adjusted in desired position, this adjustment being preferred in order to accommodate the holder to operation with confections of different sizes. That is, in Figure 4 I have shown a confection which practically occupies the whole of the mold pocket 12. If it is desired to make a smaller confection, then the stick will have to be moved downwardly in order to imbed it sufficiently in the confection. Consequently the lugs 40 ought to be moved upwardly to permit the holder to enter more completely into the upper dish portion 15 of the mold 11. It will be understood that the lugs 40 serve as stops and that the stop elements 27 have a similar function which is exercised directly by the sticks 24.

It will be understood that the lugs 40 may be omitted if desired and complete reliance may be placed upon the cooperation of the stop elements 27 and the sticks 24. However, the lugs 40 may be used for supporting the holder upon conveyors, racks, and the like, during subsequent operations such as dipping in chocolate and chilling.

On each handle 40 I provide a horizontal bar 41 which may suitably consist of two strips riveted together and having their ends bent so as to extend around the edges of the vertical portions of the handle so as slidably to engage same. On each bar 41 I pivotally mount a link 42 which extends downwardly towards the plate 21 and is provided at its lower end with an elongated relatively wide slot 43. As shown in Figure 1, the strips of metal, out of which the bars 41 are fabricated, may be spaced apart intermediate their ends, and the links 42 may extend into the space thus provided and therein may be pivoted to the bars 41.

As best shown in Figure 4, two links 42 are associated together, being pivotally mounted on the same pivot 44. Each of these links is associated with a separate rod 38, said rod extending through the slot 43 in the link. Each rod 38 passes through the openings in two links 42, one associated with each handle 39.

When it is desired to release the frozen confections, the bars 41 are pulled upwardly towards the horizontal portions of the handle 39, the result being that the rods 38 are elevated, and consequently the dogs 30, so that the confections may fall from the holder by gravity.

As a result of the loose connections provided by the enlarged openings 43 in the links 42 and the enlarged openings 37 in the upwardly directed flanges 36 of the dogs 30, each dog 30 is permitted independent movement with respect to the other dogs. Thus, in the left-hand side of Figure 4, I have shown the first stick 24 relatively thin and the second stick relatively thick. The insertion of the thick stick 24 will raise its individual dog 30 higher than the other dogs in the row but will not affect the other dogs because, even if the associated rod 38 is raised upwardly somewhat, the free lateral movement of the rod in the opening 37 of this dog and the free longitudinal movement in the opening 43 of the link 42 will prevent any movement being communicated to the other dogs 30 in the longitudinal row of the dog 30 now being discussed.

In using this holder in connection with the mold illustrated, it will be understood that after the sticks 24 are finally located within the frozen confections 35, it is necessary to remove them for subsequent manufacturing steps or packing. This may be done by applying the holder downwardly so as to bring the sticks 24 into the openings 23, wherein they become dogged by the dogs 30. Before or after this step, the mold is defrosted and the holder is raised upwardly by the handles 39, bringing the frozen confections with it.

The confections still in the holder are then treated to further manufacturing steps, such as chocolate-coating, and finally chilling to harden the chocolate coat. When the confections are to be removed from the holder, the bars 41 are elevated relative to the handles 39 and the confections are allowed to fall out by gravity, which they may do on account of the elevation of the dogs 30.

Although the invention has been described in connection with the specific details of the preferred embodiment thereof, it must be understood that such details are not intended to be limitative of the invention except in so far as set forth in the accompanying claims.

Having thus described my invention, what I claim as new and desire to secure by Letters Patent of the United States is:

1. A holder for confections provided with handles, comprising a plate having a plurality of openings adapted to receive said handles, guide means on the underside of said plate adapted to assist registration of said handles and openings, individual means above said plate associated with each opening adapted to secure said handles in said holder, and means for releasing said securing means simultaneously.

2. A holder for confections provided with handles, comprising a plate having a plurality of openings adapted to receive said handles, a dog associated with each opening and mounted on said plate, each dog being adapted to grip a handle individually and secure it to the holder, and operating means for releasing said dogs, said operating means being loosely connected to said dogs whereby said dogs are permitted individual movement to enable them to secure handles of different sizes.

3. A holder for confections provided with handles, comprising a plate provided with a plurality of openings adapted to receive said handles, a dog associated with each opening mounted on said plate, an abutment mounted on said plate along each opening on the other side of said opening from the associated dog, whereby a handle may be secured therebetween, a stop element associated with each opening and having its lower ends projecting downwardly and formed so as to serve as guides for the handles.

4. A holder for confections provided with handles, comprising a plate provided with a plurality of openings arranged in rows, guide means on the underside of said plate extending along said rows on each side of said openings adapted to serve as guides for the handles, means associated with each opening adapted to serve as guides for the handles, and means for securing the handles to the holder.

5. A holder for confections provided with handles, comprising a plate provided with a plurality of openings arranged in rows, guide means on the underside of said plate extending along said rows on each side of said openings adapted to serve as guides for the handles, means for securing handles to the holder, and means having a lost motion connection with said securing means for releasing the handles.

6. A holder for confections provided with handles, comprising a plate provided with a plurality of openings arranged in rows, a dog associated with each opening, said dogs being provided with upturned flanges having openings arranged in rows, a rod freely extending through each alinged row of flange openings, and means loosely connected to said rods whereby said dogs may be elevated simultaneously.

7. A holder for confections provided with handles, comprising a plate provided with a plurality of openings arranged in rows, a dog pivotally mounted on said plate associated with each opening, said dogs being provided with upturned flanges having openings arranged in rows, a rod freely extending through each aligned row of flange openings, means mounted above said plate for sliding vertically and links freely connecting said sliding means to said rods whereby the dogs may be elevated simultaneously.

8. A holder for confections provided with handles, comprising a plate provided with a plurality of openings arranged in rows, a dog pivotally mounted on said plate associated with each opening, said dogs being provided with upturned flanges having openings arranged in rows, a rod freely extending through each aligned row of flange openings, bail handles on said holder, bars adapted to slide vertically thereon, and links freely connecting said sliding means to said rods whereby the dogs may be elevated simultaneously.

RUDOLPH G. BIRR.